(12) United States Patent
Masanz

(10) Patent No.: US 10,065,550 B2
(45) Date of Patent: Sep. 4, 2018

(54) TOW APPARATUS

(71) Applicant: Mark A. Masanz, Cottage Grove, MN (US)

(72) Inventor: Mark A. Masanz, Cottage Grove, MN (US)

( * ) Notice: Subject to any disclaimer, the term of this patent is extended or adjusted under 35 U.S.C. 154(b) by 8 days.

(21) Appl. No.: 15/342,816

(22) Filed: Nov. 3, 2016

(65) Prior Publication Data

US 2017/0120795 A1  May 4, 2017

Related U.S. Application Data

(60) Provisional application No. 62/250,168, filed on Nov. 3, 2015.

(51) Int. Cl.
*B60P 3/07* (2006.01)
*B60P 3/12* (2006.01)
*B60P 3/077* (2006.01)
*B60D 1/155* (2006.01)
*B60D 1/66* (2006.01)
*B60D 1/00* (2006.01)

(52) U.S. Cl.
CPC ............. *B60P 3/077* (2013.01); *B60D 1/155* (2013.01); *B60D 1/665* (2013.01); *B60D 2001/001* (2013.01)

(58) Field of Classification Search
CPC ......... B62B 19/02; B62B 19/04; B62B 13/18; B60P 1/44; B60P 3/125; B60P 3/127; B60P 3/07; B60P 3/12
USPC ............... 280/7.12, 7.14, 24, 402, 492, 493; 414/483, 485
See application file for complete search history.

(56) References Cited

U.S. PATENT DOCUMENTS

| | | | | |
|---|---|---|---|---|
| 1,005,683 A * | 10/1911 | Bowers et al. | ......... | B62B 19/02 280/13 |
| 2,628,733 A * | 2/1953 | Hale | ...................... | B60S 13/00 280/402 |
| 2,706,055 A * | 4/1955 | Nichols | .................... | B60P 3/127 280/401 |
| 3,311,245 A * | 3/1967 | Galey | .................... | B60P 3/127 280/33.998 |
| 4,921,390 A * | 5/1990 | Baines | .................... | B60P 3/127 280/402 |
| 5,387,001 A * | 2/1995 | Hull | ..................... | B62D 63/061 280/402 |
| 6,425,591 B1 * | 7/2002 | Ball | ........................ | B62B 3/007 280/39 |
| 6,626,449 B2 * | 9/2003 | Hazen | .................... | B60D 1/065 280/460.1 |

(Continued)

*Primary Examiner* — Anne Marie M Boehler
(74) *Attorney, Agent, or Firm* — Brooks, Cameron & Huebsch, PLLC

(57) ABSTRACT

Tow apparatuses are described herein. For example, in one or more embodiments of the present disclosure a tow apparatus includes a platform having a plurality supports for maintaining at least one wheel of a vehicle to be towed on the platform, at least one ground interface mechanism connected to the bottom of the platform, a tongue having a first portion for attachment to a tow vehicle, a second portion attached to the platform, and a hinge between the first and second portions to allow the first portion to tilt with respect to the second portion, and a mechanism to allow the ground interface mechanism on the platform to change direction with respect to the tow vehicle.

17 Claims, 19 Drawing Sheets

(56) References Cited

U.S. PATENT DOCUMENTS

| | | | | |
|---|---|---|---|---|
| 6,659,491 B2* | 12/2003 | Green | ............... | B62D 63/065 |
| | | | | 280/423.1 |
| 7,188,848 B2* | 3/2007 | Chapman | ............... | B60D 1/30 |
| | | | | 224/519 |
| 7,584,980 B2* | 9/2009 | Thompson | ............ | B60D 1/155 |
| | | | | 280/402 |
| 7,789,411 B2* | 9/2010 | Schuettenberg | ......... | B60D 1/00 |
| | | | | 280/400 |
| 8,876,141 B1* | 11/2014 | Craft | ............... | B60D 1/143 |
| | | | | 280/492 |
| 8,926,253 B2* | 1/2015 | Uttech | ............... | B60P 1/4414 |
| | | | | 414/462 |

* cited by examiner

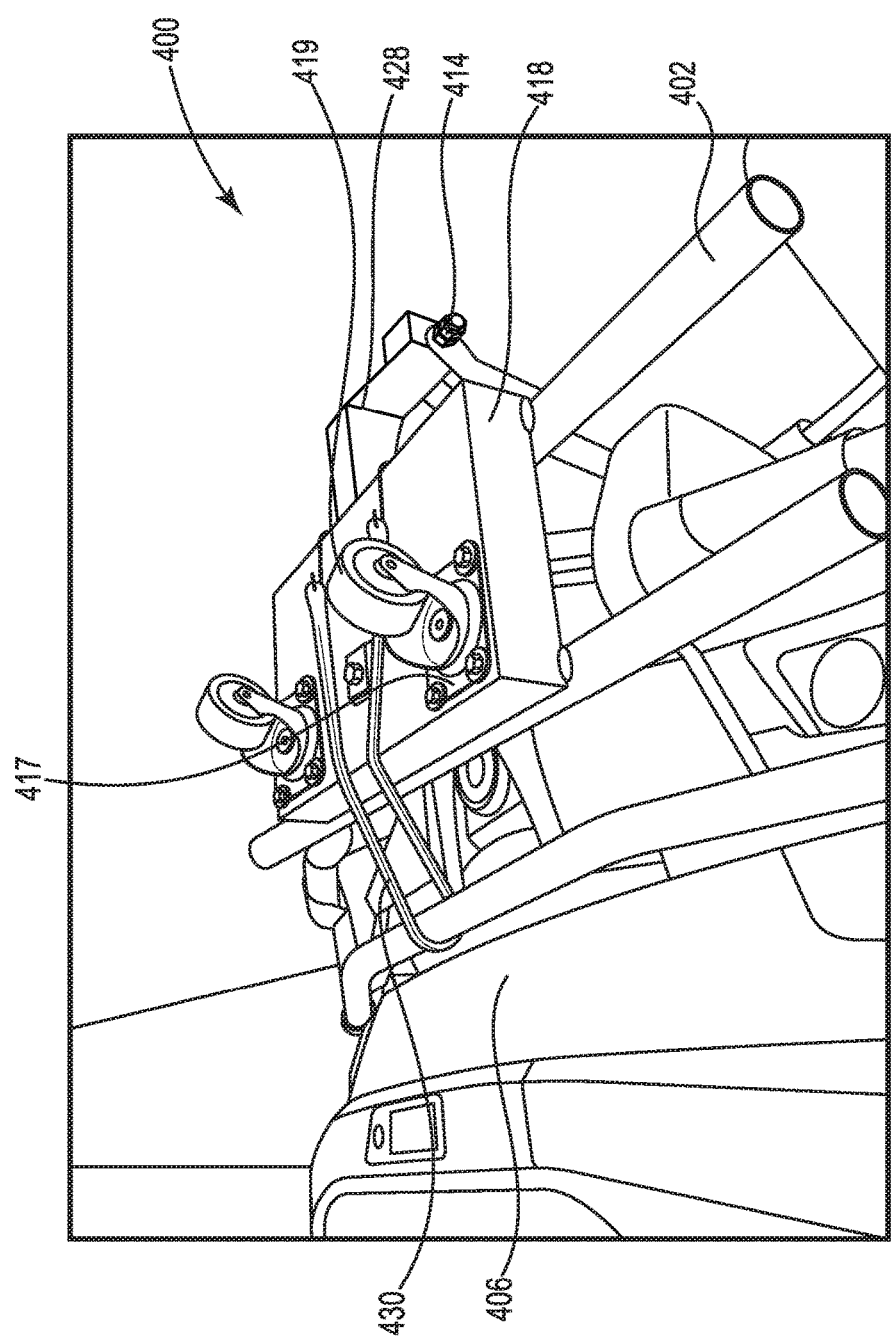

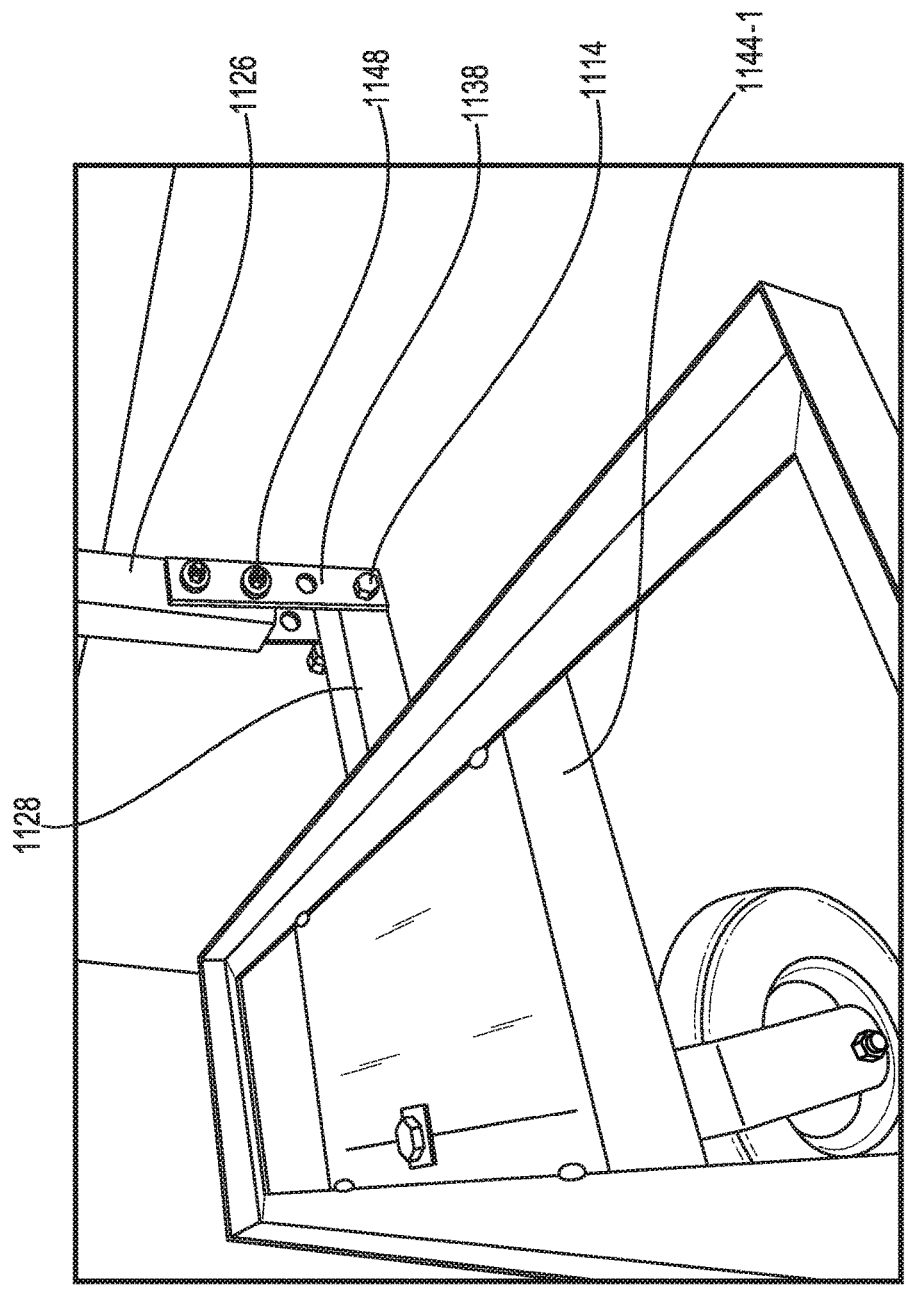

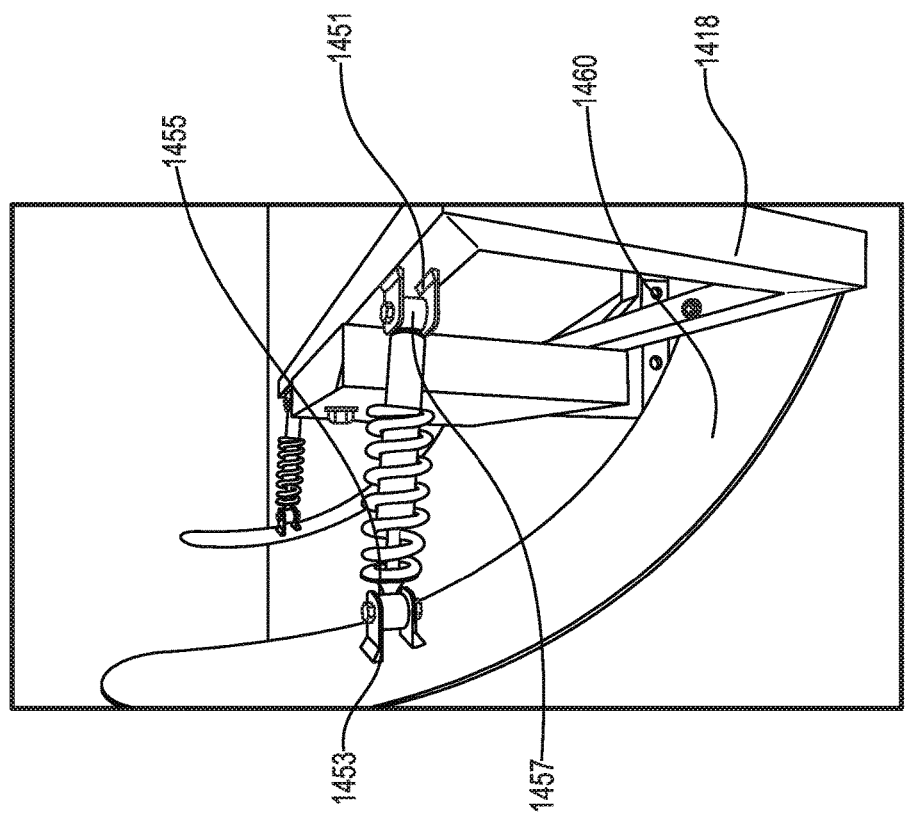

TOW APPARATUS

CROSS REFERENCE TO RELATED APPLICATION

This application clams priority to U.S. Provisional Application No. 62/250,168 filed Nov. 3, 2015, the specification of which is incorporated herein by reference.

TECHNICAL FIELD

The present disclosure relates to apparatuses for towing a vehicle behind another vehicle.

BACKGROUND OF THE DISCLOSURE

Towing vehicles behind other vehicles can be beneficial in some applications. For example, when traveling with underage all-terrain vehicle drivers (those not having driver's licenses or permits), they may not be permitted to travel on city, county, or state roads without a driver's license. Since many trails cross such roads or it may be necessary to traverse these roads to get to a trail, it can be difficult to travel with these drivers while obeying the law.

The current process is to haul the all-terrain vehicle to the location where the underage driver can operate the vehicle and then transport the underage driver to that location. This can result in additional equipment being needed or multiple trips to transit everything to the location.

Additionally, in some instances, a vehicle may become disabled and transport of the disabled vehicle by another vehicle may be necessary. For example, an all-terrain vehicle may become disabled in a location that is inaccessible by a larger vehicle, such as a truck.

In another example, a car may be unable to be started and may need to be moved to a repair shop for service. In such examples, a tow truck may be used to tow the vehicle, but many are not equipped to handle difficult terrain and contacting a towing service is costly and may not be available at a convenient time or at the location of the vehicle needing to be moved.

Further, in some instances, a heavy or bulky item (e.g., a deer) may need to be moved from a location (a wooded area with no roads) where a traditional vehicle (e.g., car or truck) may not be able to access the item. In such circumstances, the item may need to be left, multiple people may need to carry the item out, or the item may need to be broken into small parts to transport it out of the area.

BRIEF DESCRIPTION OF THE DRAWINGS

FIG. 4 illustrates a tow apparatus in a folded up position in accordance with one or more embodiments of present disclosure.

FIG. 11 illustrates an angled, elevated side view of a tow apparatus having a tilting tongue mechanism in accordance with one or more embodiments of the present disclosure.

FIGS. 14A, 14B, and 14C illustrate a ground interface mechanism in the form of skis according to one or more embodiments of the present disclosure.

DETAILED DESCRIPTION OF THE DISCLOSURE

The present disclosure provides tow apparatus embodiments that allow a vehicle to be towed behind another vehicle, for example, one off-highway vehicle (OHV) behind another OHV. Such an apparatus can be particularly beneficial when used with an OHV. As used herein, an OHV is defined as any motor vehicle designed for or capable of cross-country travel on or immediately over land, water, sand, snow, ice, marsh, swampland, or other natural terrain, but not primarily for use on paved roads or in water.

OHV's can get into a lot of areas that cars and trucks cannot access and as such, there are some circumstances in which an operator may need assistance and cannot get it without some difficulty and in which the embodiments of the present disclosure can provide substantial benefits. For example, if an OHV is disabled in an area inaccessible to a car or truck, the OHV can be towed out of the area through use of an embodiment of the present disclosure.

Further, some states or provinces require that children, of a certain age, not drive on paved roads on OHV's. In such areas, a driver that can traverse such roads can tow the ineligible person's OHV through the area while the ineligible person rides on/in another vehicle.

Additionally, in some instances, a heavy item may need to be moved from an area inaccessible to cars and trucks and the item is too bulky to ride on the body of the OHV. In such circumstances, it may be possible to place the item on the platform of an embodiment of the present disclosure allowing it to be removed from the area.

Figure 1:
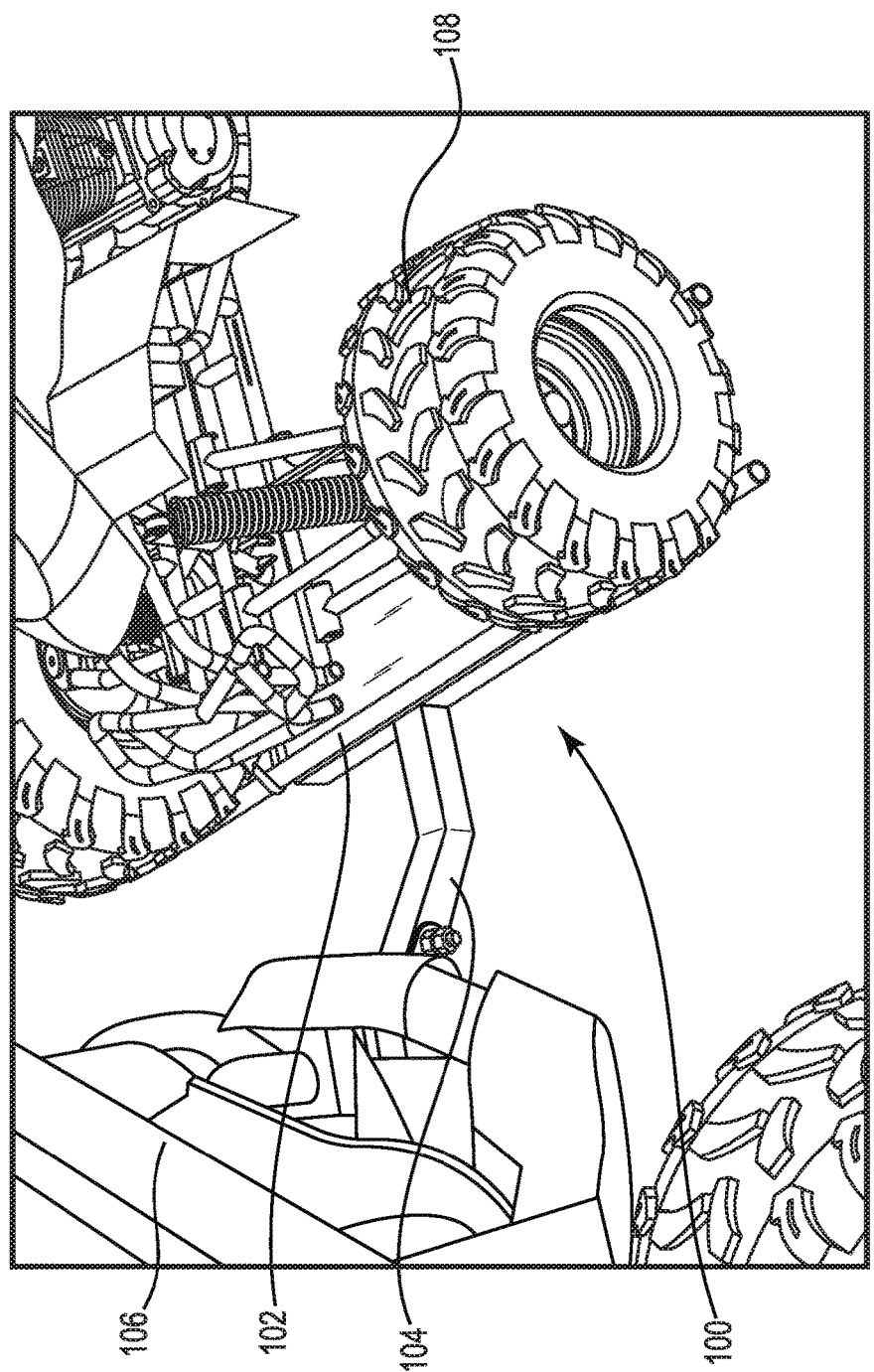
FIG. 1 illustrates an embodiment of a tow apparatus in accordance with one or more embodiments of the present disclosure.

FIG. 1 illustrates an embodiment of a tow apparatus in accordance with one or more embodiments of the present disclosure. In the embodiment illustrated in FIG. 1, a tow apparatus 100 is connected to a vehicle 106 by a tongue 104. The tongue 104 is connected to a tow platform 102 on which tires of a vehicle to be towed 108 are placed. In the example in FIG. 1, the front wheels are placed on the platform 102, but in various embodiments, either the front or rear wheels (towing the vehicle backwards) can be positioned on the platform.

Figure 2:
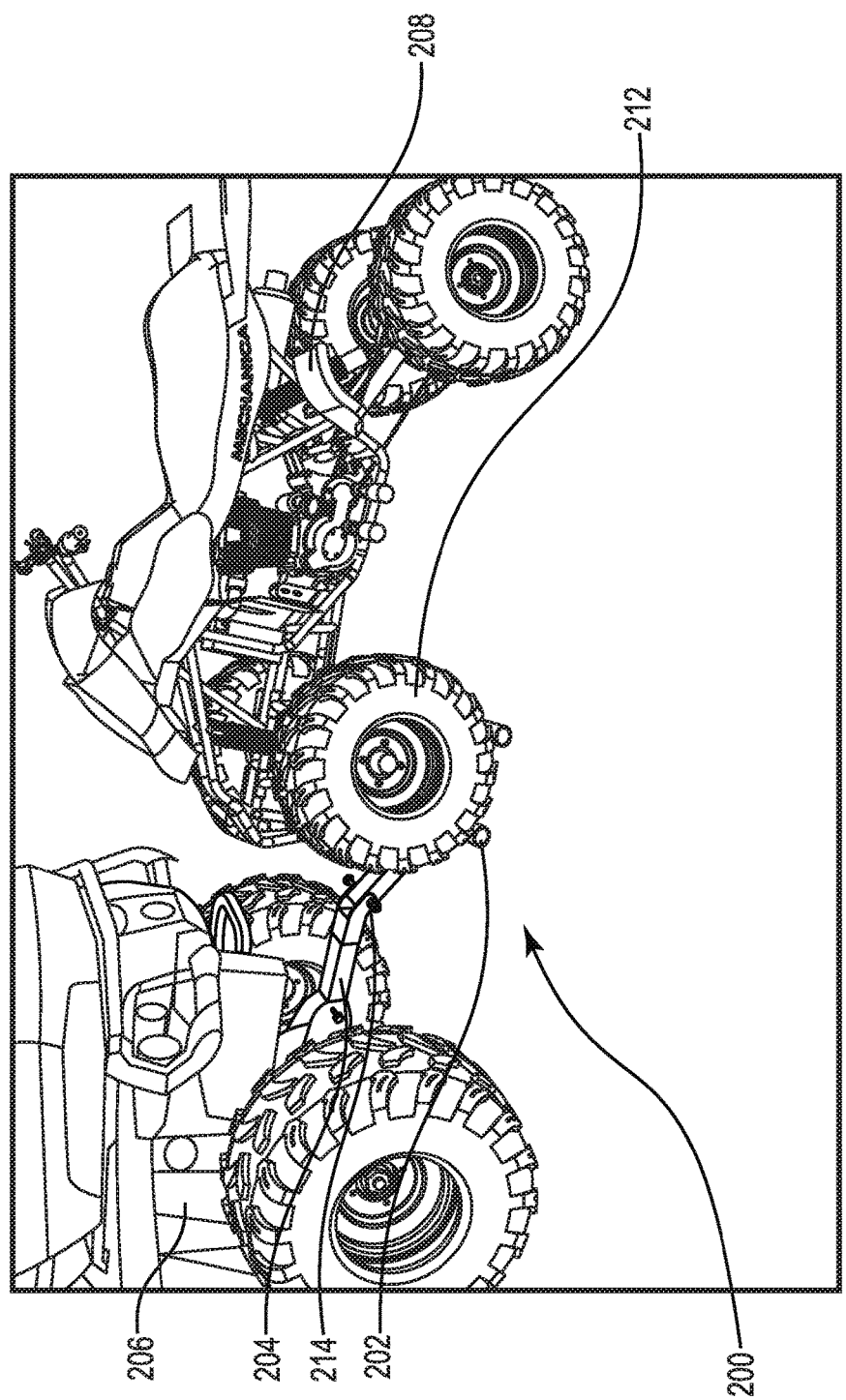
FIG. 2 illustrates the embodiment of FIG. 1 connected to a vehicle and having a vehicle to be towed positioned thereon according to one or more embodiments of present disclosure.

FIG. 2 illustrates the embodiment of FIG. 1 connected to a vehicle and having a vehicle to be towed positioned thereon according to one or more embodiments of present disclosure. The tow apparatus 200 is attached to the tow vehicle 206 by the tongue 204. In this view, it can be seen that the tongue 204 has multiple portions that allow the tongue to flex in one or more directions.

In the embodiment shown in FIG. 2, the tongue 204 can flex in a vertical direction through use of a hinge 214 between two tongue portions allowing rotation around a hinge pin. The vehicle to be towed 208 is positioned with its wheels 212 on the platform 202 of the tow apparatus 200.

As shown, in this figure, the vehicle to be towed has one or more wheels on one axis (front wheel or wheels or back wheel or wheels) on the platform with the wheels of other axes of the vehicle to be towed not on the platform. In this manner, the wheel or wheels on the platform allow connection of the vehicle to be towed to the platform, while the other wheel or wheels, not on the platform can be used to reduce the weight of the vehicle to be towed on the platform and aid in moving the vehicle along the terrain (using the other wheel or wheels to traverse the terrain, if they are in contact with the ground.

Figure 3A:
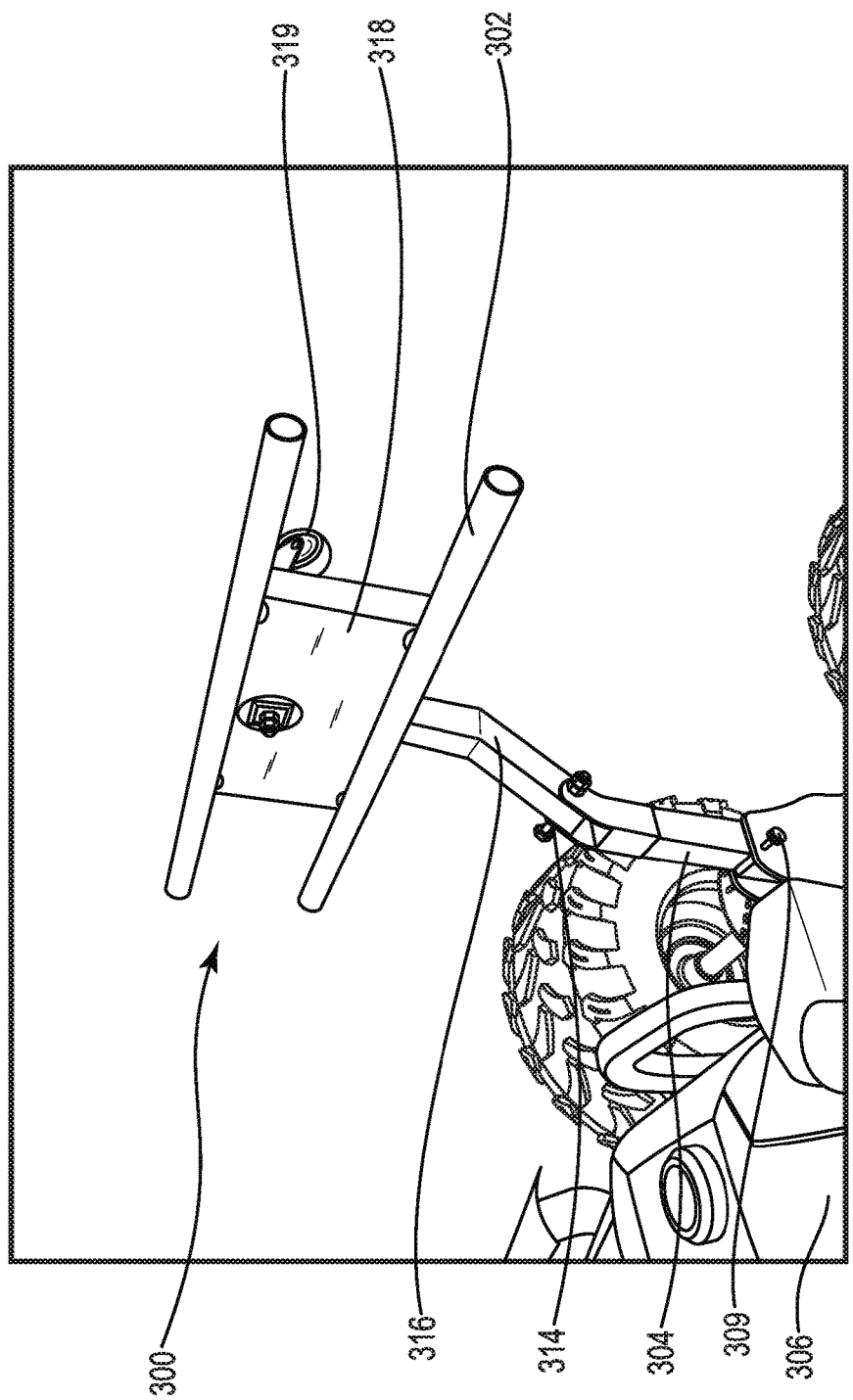
FIG. 3A illustrates an elevated side view of the embodiment of FIG. 1.

FIG. 3A illustrates an elevated side view of the embodiment of FIG. 1. In FIG. 3A, the vehicle to be towed has been removed so that some features of the tow apparatus embodiment 300 can be seen more clearly.

In this embodiment, the tow apparatus 300 includes a platform 318. The platform 318 can include one or more wheel supports 302 (supports shown in FIG. 3 include a front support nearest to the tow vehicle and a back support nearest the body of the vehicle to be towed). Wheel supports can, for example, be used to support a front surface or back surface of a tire, as shown in FIG. 2.

The wheel supports can be used to assist in holding the wheel to the platform. For example, in the embodiment of FIG. 3A, there is a space between the supports 302 that allows the wheel to rest between the supports as shown in FIG. 2. In this manner, the supports can act as a cradle.

The tow apparatus 300 also includes one or more ground interface mechanisms. As used herein a ground interface mechanism is a mechanism that allows the tow apparatus to traverse the ground more smoothly than without the mechanism. Some examples provided herein include wheels and skiis, but other suitable mechanisms could also be used alternatively or in conjunction with those discussed in the examples provided herein.

In the embodiment of FIG. 3A, wheels 319 are located under the platform 318. The wheels contact the ground to allow the tow apparatus 300 to support the tow vehicle 306, but still allow the tow apparatus 300 to move along the ground, enabling the vehicle to be towed.

In some embodiments, such as that shown in the embodiment of FIG. 3A, the wheels 319 may be attached in a swiveling manner to allow them to turn with respect to the surface of the ground. In some embodiments, as will be discussed in more detail below, the tongue of the tow apparatus can have a swiveling mechanism that allows the tow apparatus to turn with respect to the direction of the tow vehicle. This allows the vehicle being towed to turn more similarly to the tow vehicle, thereby allowing the vehicle to be towed with less wear and tear on the tires and other components of the vehicle being towed.

The tow apparatus embodiment 300 illustrated in FIG. 3A also includes a tongue 304 connected to the tow vehicle 306. The connection can be any suitable connection mechanism. For example, the connection can be a releasable junction that allows removal of the tongue 304 from the tow vehicle 300.

For instance, in the embodiment of FIG. 3A, the tongue 304 and tow vehicle 306 include holes through which a pin 309 is positioned. When the pin 309 is in place, the tongue 304 and the tow vehicle 306 remain attached to each other and when removed, the tow apparatus 300 can be removed from the tow vehicle 306.

In the embodiment of FIG. 3A, the tongue 304 also includes multiple portions that allow the tongue to flex in one or more directions. As discussed with respect to the embodiment of FIG. 2, in the embodiment shown in FIG. 3A, the tongue 304 can flex in a vertical direction through use of a hinge 314 between two tongue portions allowing rotation around hinge pin.

The vehicle to be towed is positioned with its wheels on the platform 302 of the tow apparatus 300. That allows the vehicle to move up and down as the terrain over which the vehicle is being towed changes.

In some embodiments, the tongue 304 can have a bend 316. The bend, in conjunction with the hinge, can be beneficial in allowing the tow apparatus to be positioned closer to the ground. This can be helpful, for example, as shown in FIG. 2, where a larger vehicle is towing a smaller one.

In such instances, often times the large vehicle has an aperture for attachment of a tongue that is much higher than the height of the platform of the tow apparatus. Without the hinge, the tow apparatus, in such instances, would not have its wheels on the ground or would need large wheels that would touch the ground. In such embodiments, without the bend, the angle of the platform to the surface of the ground, in such instances, may result in a poor orientation for towing the vehicle.

Figure 3B:
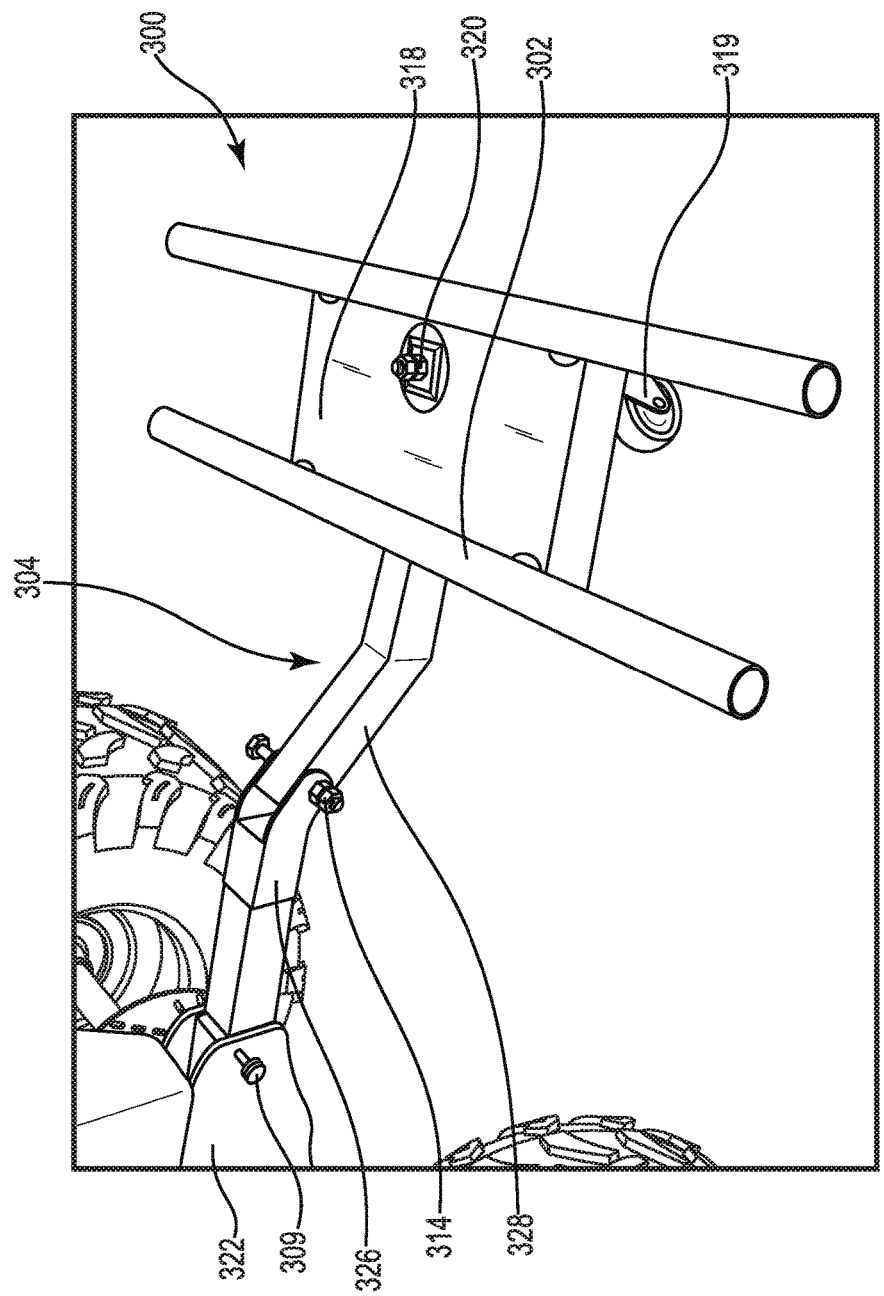
FIG. 3B illustrates a close-up, elevated side view of the embodiment of FIG. 1.

FIG. 3B illustrates a close-up, elevated side view of the embodiment of FIG. 1. Similar to the view of FIG. 3A, this view includes tow apparatus 300, with a platform 318, supports 302, and wheels 319.

The tow apparatus 300 also includes a tongue 304 that has multiple portions. In this embodiment, the tongue 304 has a first portion 326 that is connected to a receiver 322 on a tow vehicle. In this embodiment, the tongue 304 is fixed to the receiver with pin 309. In some embodiments, the connection is rigid and generally does not allow any substantial side to side or up and down movement with respect to the tongue portion 326 and the receiver 322.

The tongue 304 also includes a second portion 328 connected to the first portion 326 in a manner such that the second portion 328 can rotate with respect to the first portion 326, as will be discussed in more detail below. For example, as shown in FIG. 3B, the attachment can be by a pin 314 that passes through holes in portions 326 and 328 and allows the second portion 328 to rotate around the pin 314.

The second portion 328 is also connected to the platform 318. The attachment can be a rigid attachment or, in some embodiments, can be attached to allow the platform to turn with respect to the tongue 304. For example, in the embodiment of FIG. 3B, the tongue 304 is attached to the platform via a pin 320 that passes through holes in the platform and the tongue 304 to secure them together such that the tongue 304 can rotate around the pin 320. In this manner, the platform can be angled with respect to the tongue allowing the tow apparatus to more easily turn when being towed.

FIG. 4 illustrates a tow apparatus in a folded up position in accordance with one or more embodiments of present disclosure. In the embodiment of FIG. 4, the tow apparatus 400 has been folded up so that it is close to or contacting the back of tow vehicle 406. The use of a hinge 414 (rotating the platform 418 attached to the second portion 428 around the hinge pin of hinge 414) allows for the tow apparatus to be folded up for easier attachment to the tow vehicle and/or for storage and/or transport (e.g., within a storage space in the tow vehicle).

Also shown in FIG. 4 are the wheels 419 and the wheel supports 402. The wheels shown in FIG. 4 are swivel type wheels that each have a swivel base 417 connected to the platform 418 allowing the wheel to rotate around a point on the base 417. In some embodiments, restricting mechanisms can be used to restrict the movement of the wheel around the center of the base in one or both directions, however, in some embodiments, the wheel may swivel 360 degrees around the center of the base. Such freedom of movement can be beneficial as the wheels can adjust as the terrain on which the wheels are traversing changes.

FIG. 4 also illustrates that the tow apparatus 400 can be releasably attached to the tow vehicle to allow it to be folded down for use. Any suitable mechanism can be used to attach the tow apparatus 400 to the tow vehicle 406. In the embodiment of FIG. 4, the mechanism is a bungee cord 430 attached to the tow vehicle 406 and tow apparatus 400.

FIG. 4 provides a good view of the wheel supports 402. The wheel supports in this embodiment extend outward on both sides of a main platform section 418, allowing two wheels of a vehicle to be supported thereby.

However, in some embodiments, the tow apparatus could be designed to similarly tow a three wheeled vehicle (with one front wheel) or a motorcycle. For example, the platform and supports may be designed to support a single wheel or two wheels (e.g., two front wheels) from different motorcycles.

Figure 5:
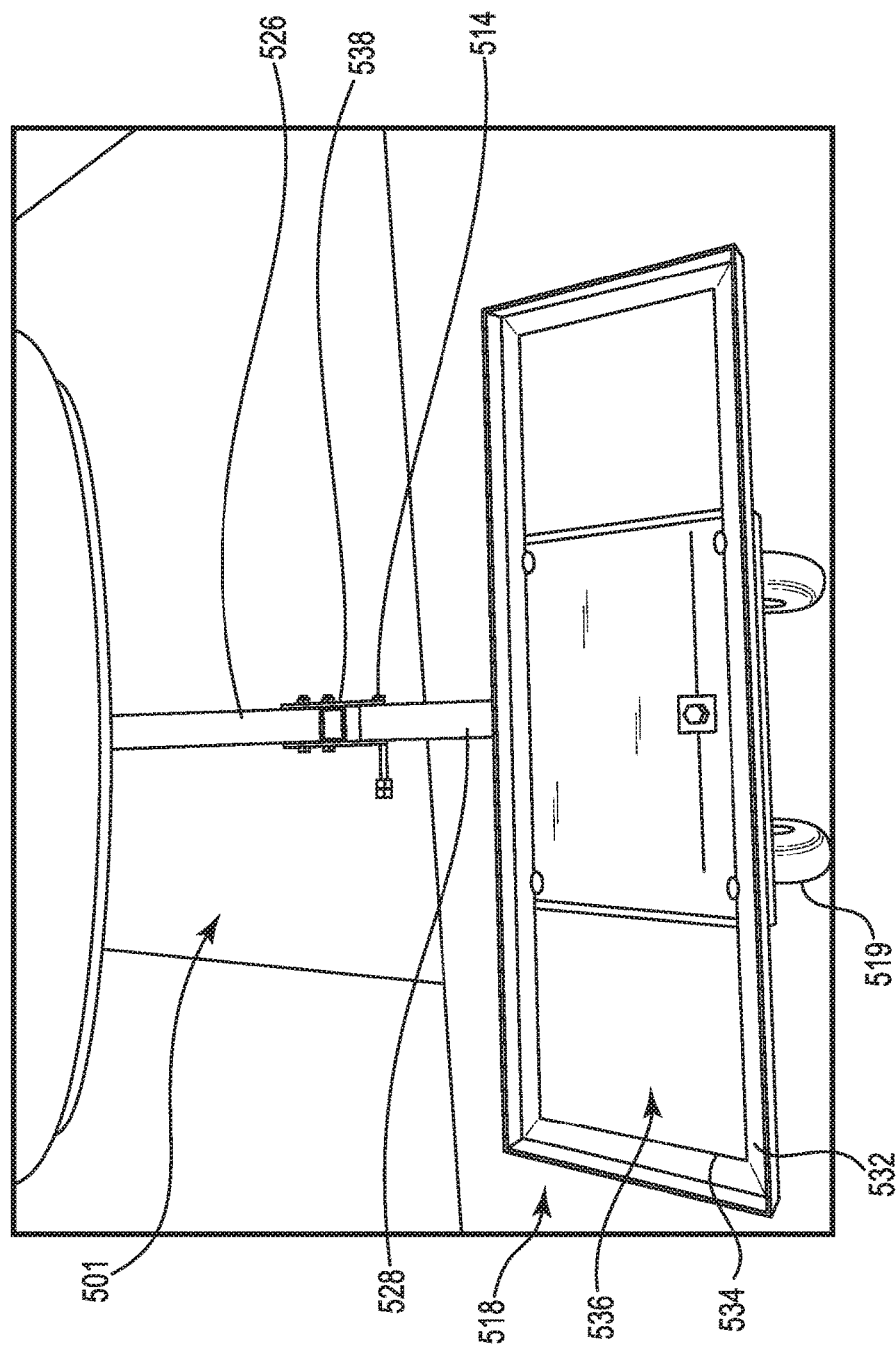
FIG. 5 illustrates a top view of another embodiment of a tow apparatus in accordance with one or more embodiments of the present disclosure.

FIG. 5 illustrates a top view of another embodiment of a tow apparatus in accordance with one or more embodiments of the present disclosure. Similar to the embodiment of FIGS. 3A and 3B, this embodiment of a tow apparatus 501 includes a platform 518, a tongue having a first portion 526 connected via a hinge pin at hinge 514 to a second portion 528, wheel supports 532, and wheels 519.

The embodiment of FIG. 5 also includes some differences to that of FIGS. 3A and 3B. For example, each wheel support has a first end and a second end and the first ends of the supports 532 are connected by a strut 534 (in this example, the second ends are also connected by a strut) and thereby form an aperture 536 for placement of a portion of the wheel of the vehicle to be towed into the aperture. These apertures 536 can be sized to accommodate any size wheel for a vehicle that is intended to be towed.

The tongue in FIG. 5 has a first portion 526 connected via a hinge pin at hinge 514 to a second portion 528, but also includes flanges 538 attached on either side of the first and second portions 526 and 528. This arrangement allows for a space to be provided between the ends of the first and second portions 526 and 528 which allows for the first portion 526 to be folded for storage and/or attachment to the tow vehicle.

Figure 6:
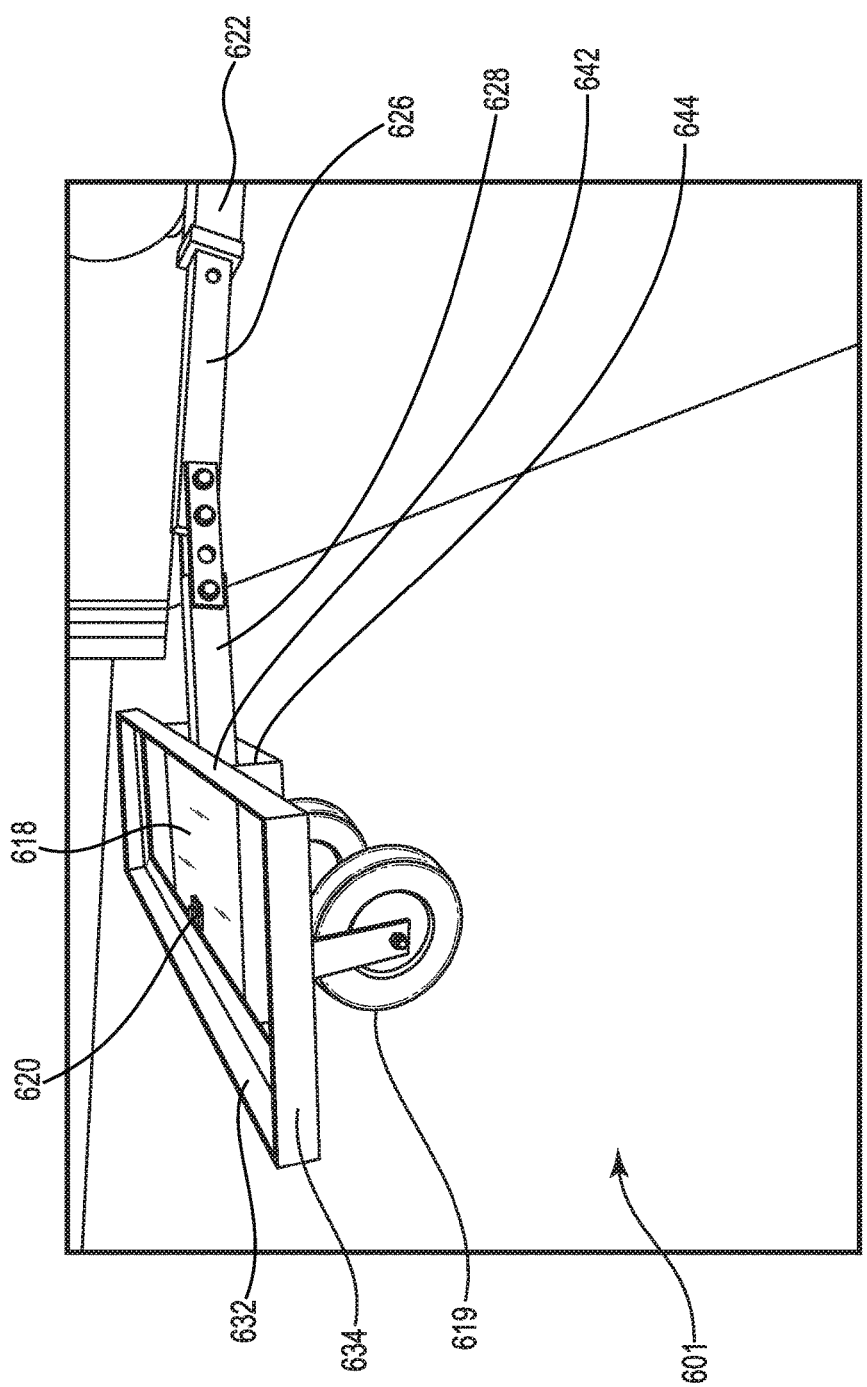
FIG. 6 illustrates a side view of the embodiment of FIG. 5.

FIG. 6 illustrates a side view of the embodiment of FIG. 5. The view of FIG. 6 shows another type of wheels 619 that may be used in some embodiments. The wheels in this embodiment are larger and are filled with fluid (air, nitrogen, etc.), but could also be filled with any other suitable material (e.g., sand, foam, etc.) that allows them to maintain their shape.

This view also shows the receiver 622 and the first portion of the tongue 626 connected thereto. This connection is preferably a rigid connection that does not allow movement of the connection between the tongue and the receiver.

In the embodiment of FIG. 6, the second portion of the tongue 628 is attached so that it rotates around the attachment point 620. A pair of stops (one shown at 644) are provided that limit the movement of the second portion, so that it can only move a limited amount on either side of a center point on the front side of the platform 618 (the side closest to the tow vehicle).

The embodiment of FIG. 6 also includes wheel supports 632 and 642 and struts 634. In this embodiment, the wheel supports have horizontal surfaces (surfaces that are generally parallel to the surface of the ground) and vertical surfaces (surfaces that are generally normal to the surface of the ground). The horizontal surface can be beneficial, for example, to support the weight of the vehicle being towed. The vertical surfaces can be beneficial, for example, by assisting in maintaining the position of the wheels on the tow apparatus 601.

Figure 7:
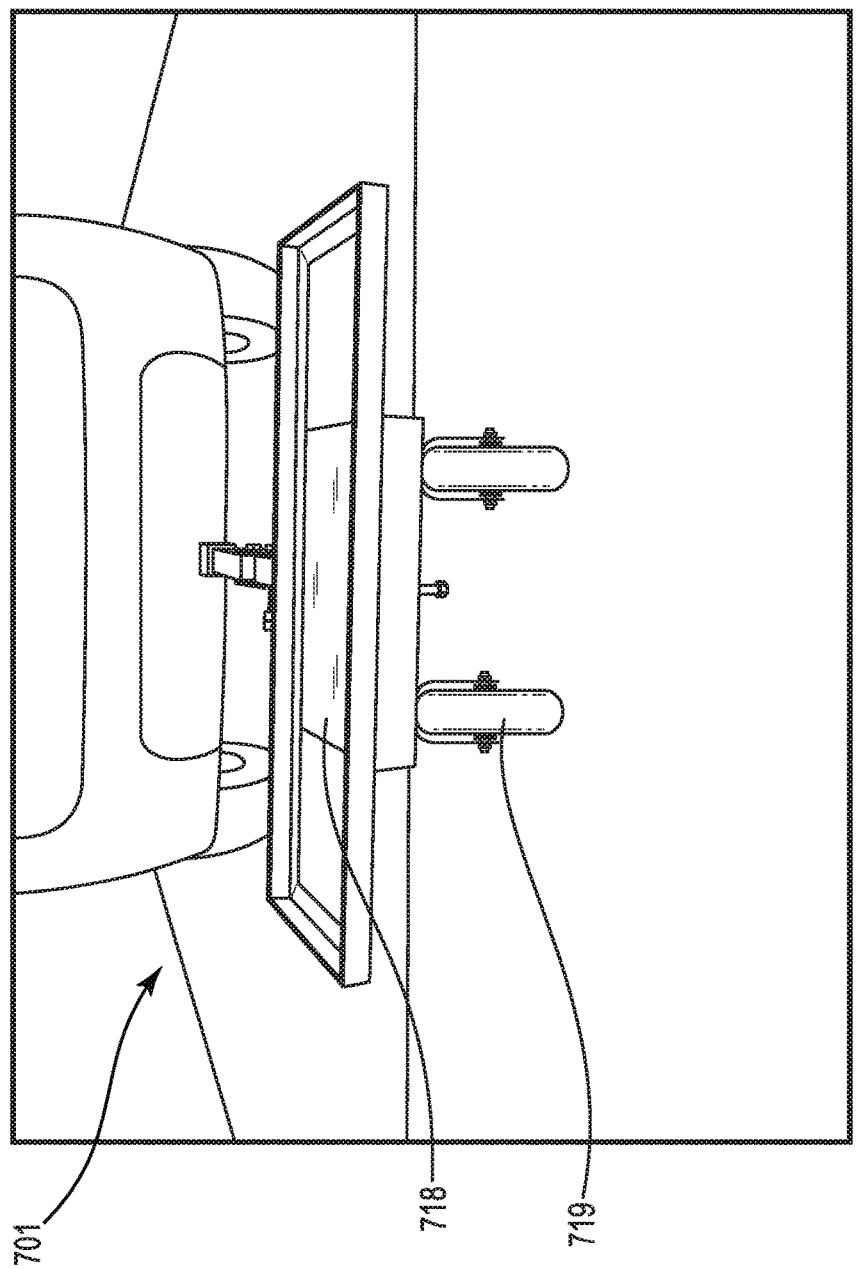
FIG. 7 illustrates an elevated rear view of the embodiment of FIG. 5.

FIG. 7 illustrates an elevated rear view of the embodiment of FIG. 5. FIG. 7 provides a good view of the wheels of the tow apparatus 701 and their relation to the platform 718. As can be seen in this figure, the wheels 719 are positioned under the main portion of the platform 718, however, the embodiments of the present disclosure are not limited to such positioning and any suitable positioning of the wheels can be used. Additionally, although two wheels are shown, one or more wheels can be used, in some embodiments.

Figure 8:
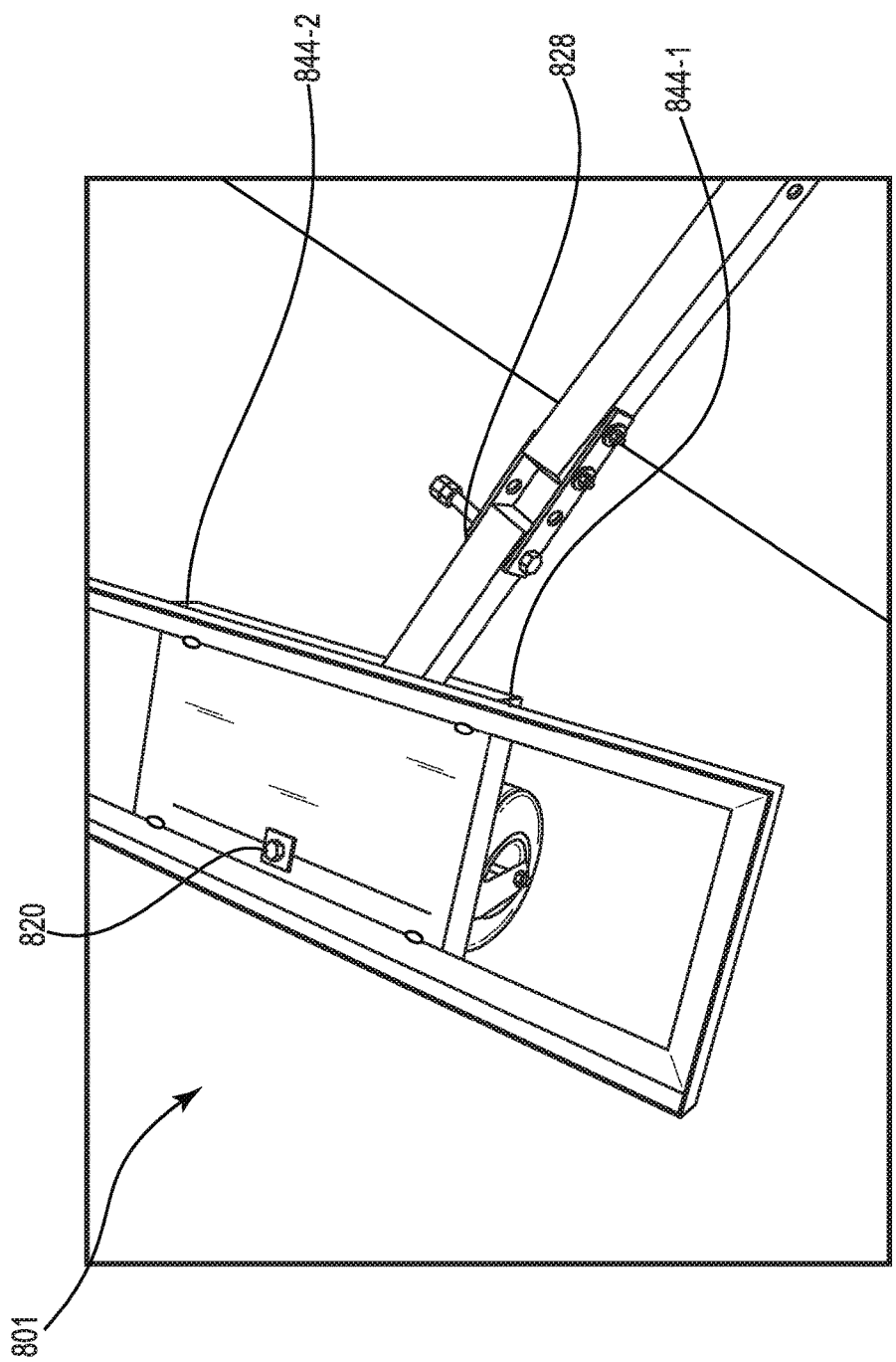
FIG. 8 illustrates an angled top view of a tow apparatus having a swiveling tongue mechanism in accordance with one or more embodiments of the present disclosure.

FIG. 8 illustrates an angled top view of a tow apparatus having a swiveling tongue mechanism in accordance with one or more embodiments of the present disclosure. In this embodiment, the second portion of the tongue 828 is attached to the platform at attachment point 820.

Figure 9:
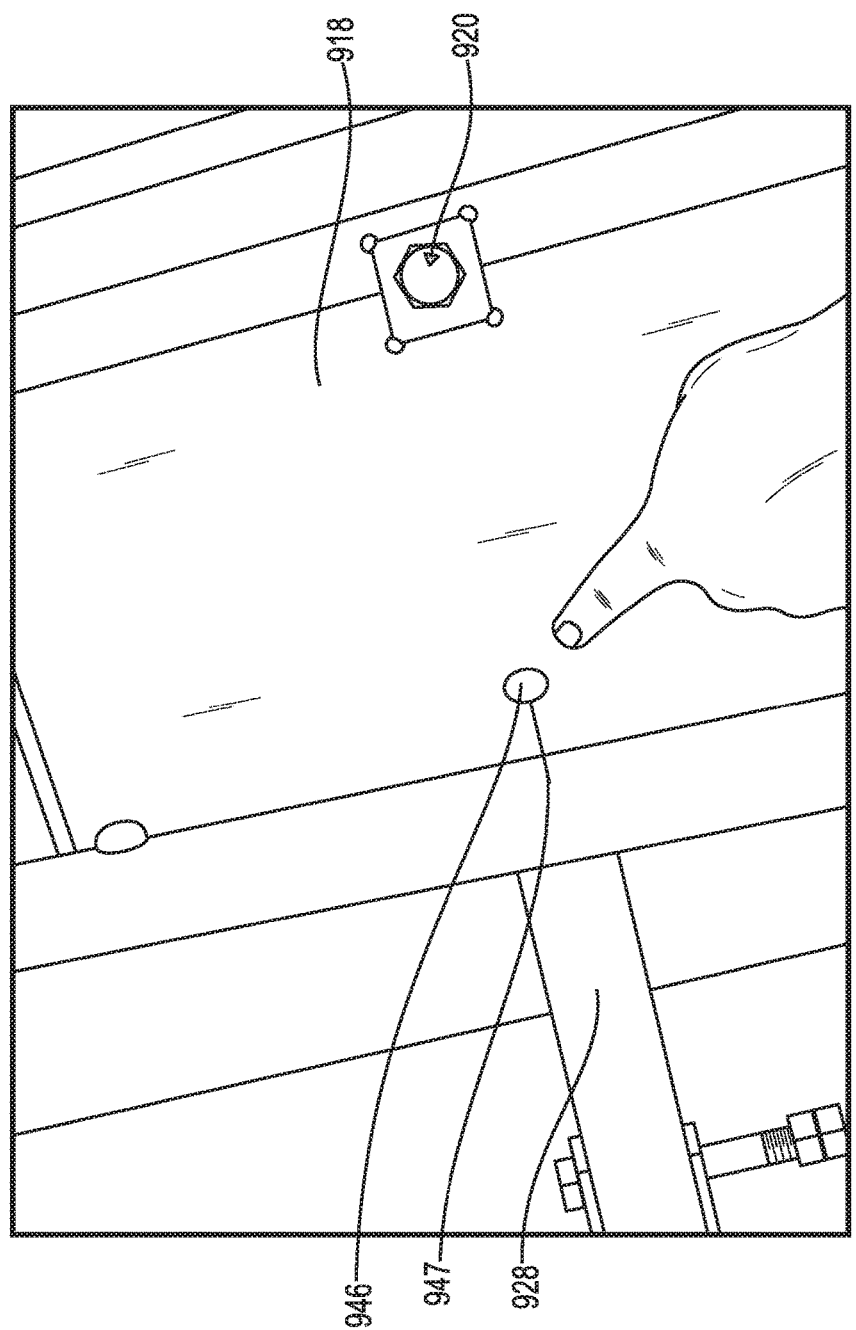
FIG. 9 illustrates a top view of a tow apparatus having a swivel stop tongue mechanism in accordance with one or more embodiments of the present disclosure.

The attachment is such that the tongue can rotate around the attachment point 820, so that the tongue can swivel from one side to the other of a center line between the attachment point and a point perpendicular to the front side of the platform (indicated in FIG. 9 at 947). In such embodiments, the swiveling tongue mechanism allows one end of the tongue to move with respect to the platform. In this manner, the tow apparatus 801 can be easier to tow as the wheels will turn in the direction that a towing vehicle is turning.

The embodiment of FIG. 8 includes stop mechanisms 844-1 and 844-2 that limit the motion of the second portion of the tongue 828. As discussed above, the second portion of the tongue 828 is attached at or near one end at 820 to the platform. The second portion of the tongue 828 can rotate around that point (the end of the second portion stays in the same place at the attachment point and the rest of the second portion moves around that point). However, the stops 844-1 and 844-2 limit the rotation of the second portion to a defined rotational range.

FIG. 9 illustrates a top view of a tow apparatus having a swivel stop tongue mechanism in accordance with one or more embodiments of the present disclosure. In some embodiments, the tongue can be attached at a second point to fix its movement.

For example, as shown in the embodiment of FIG. 9, the platform 918 and second portion of the tongue 928 include a hole and a releasable or fixed pin 946 can be inserted therein to fix the platform 918 and second portion of the tongue 928, either temporarily or permanently, together.

The use of such a releasable or fixed pin acts as a locking mechanism to stop the movable one end of the tongue from moving with respect to the platform. When the pin is releasable, the movement can be selectively fixed or allow based on whether the pin is placed in the hole.

In the embodiment of FIG. 9, the attachment point of the second portion 928 to the platform 918 is provided by a pin 920 around which the second portion 928 rotates. Also shown in FIG. 9 is a center line of the platform at 947.

The rotational nature of the connection between the second portion 928 and the pin 920, allows that second portion to swivel from side to side of the center line 947. When the second pin 946 is positioned in the holes of the platform 918 and second portion of the tongue 928, the second portion 928 is fixed along the center line 947. The center line (or a center point at the edge of the center line and the platform) is provided herein as a reference for the movement of the tongue and the embodiments herein are not required to have such a line or point.

It can be beneficial to utilize a releasable pin in some embodiments, as it may be useful to have the platform fixed to the tongue when loading the vehicle to be towed. But, it may be beneficial to have them not fixed when driving with the vehicle being towed as the tow apparatus turns more easily when the platform and second portion of the tongue are not fixed, as discussed above. As such, having a removable pin allows the tow apparatus to have the benefits of both conditions.

Figure 10:
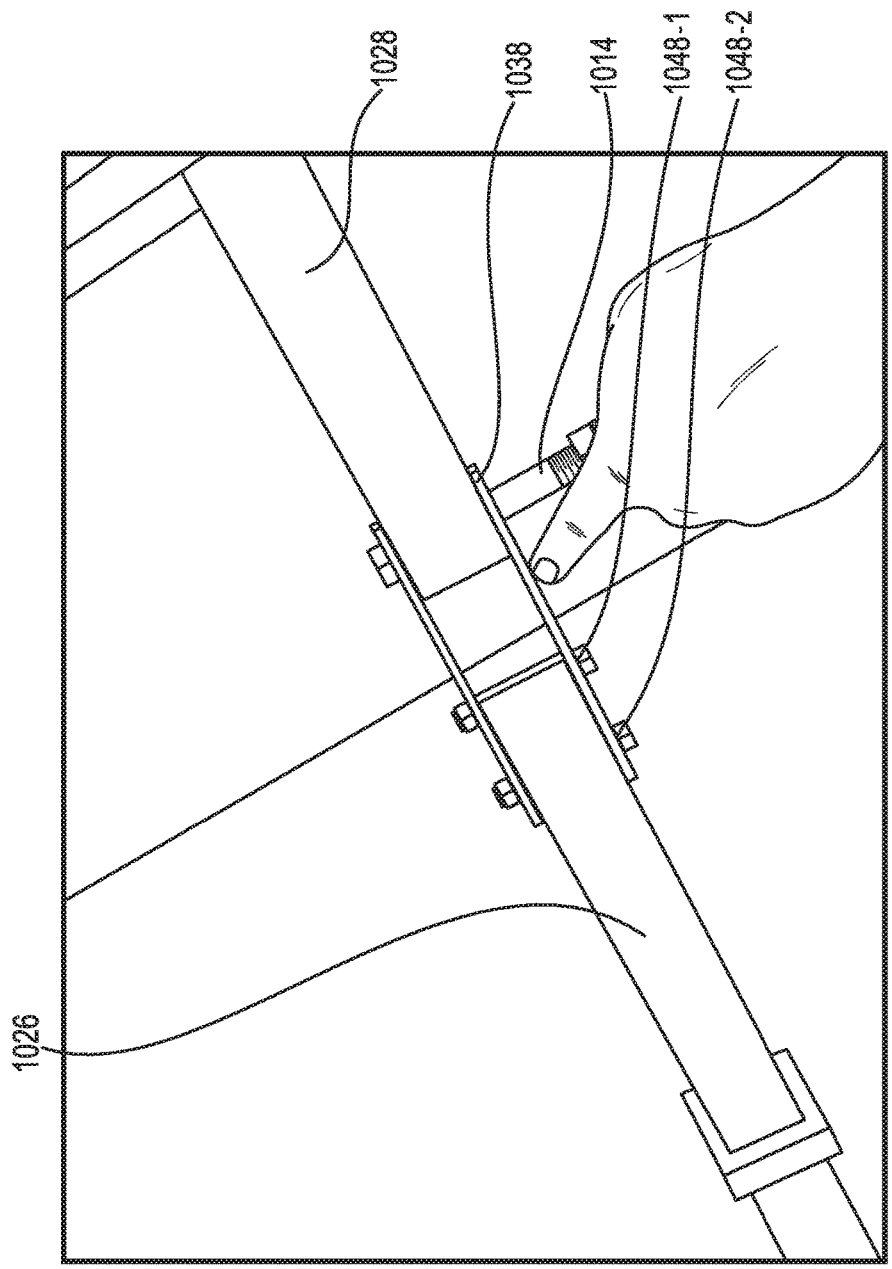
FIG. 10 illustrates a top view of a tow apparatus having a tilting tongue mechanism in accordance with one or more embodiments of the present disclosure.

FIG. 10 illustrates a top view of a tow apparatus having a tilting tongue mechanism in accordance with one or more embodiments of the present disclosure. In FIG. 10, a hinge mechanism is shown that is utilized in some embodiments of the present disclosure. In this embodiment, the first portion of the tongue 1026 is connected to the second portion 1028 via two flanges 1038 located on each side of the first and second portions.

The flanges 1038 are attached to the first portion 1026 with two pins 1048-1 and 1048-2 (e.g., releasable pins or fixed pins, such as nuts with bolts) positioned in holes in both the flanges 1038 and the first portion 1026. In this manner, the flanges 1038 and the first portion 1026 are fixed such that they will not move with respect to each other.

The flanges 1038 are attached to the second portion 1028 with one pin 1014 (e.g., releasable pin or fixed pin) positioned in a hole in both the flanges and the second portion 1028. In this manner, the flanges 1038 and the second portion 1028 are not fixed such that the second portion will rotate around the pin 1014.

The end of the first portion 1026 and the end of the second portion 1028 can be spaced apart slightly, as shown in FIG. 10, so that the second portion can be moved freely with respect to the first portion 1026, such that their ends do not contact each other. One of the benefits of such a structure is illustrated in FIG. 11.

FIG. 11 illustrates an angled, elevated side view of a tow apparatus having a tilting tongue mechanism in accordance with one or more embodiments of the present disclosure. As described with respect to the embodiment of FIG. 10, the view shown in FIG. 11 illustrates how the two portions of the tongue can be tilted, in this view for purposes of compact storage of the tow apparatus.

This can be accomplished by tilting the first portion 1126 upward with respect to the second portion 1128 at hinge 1114. As in the embodiment of FIG. 10, the flanges 1138 are fixed to first portion 1126 with pins 1148 and are rotatably connected to the second portion 1128 with the pin at hinge 1114.

Also shown in FIG. 11 is a movement limiting and support structure 1144-1 that acts as one of the stops to limit the swiveling movement of the second portion 1128. This structure 1144-1 also forms a support structure of the main part of the platform to provide extra strength to the platform so that it can support more weight. In some such embodiments, separate structures can be used to support the weight of the vehicle to be towed and to limit the swiveling movement.

Figure 12A:
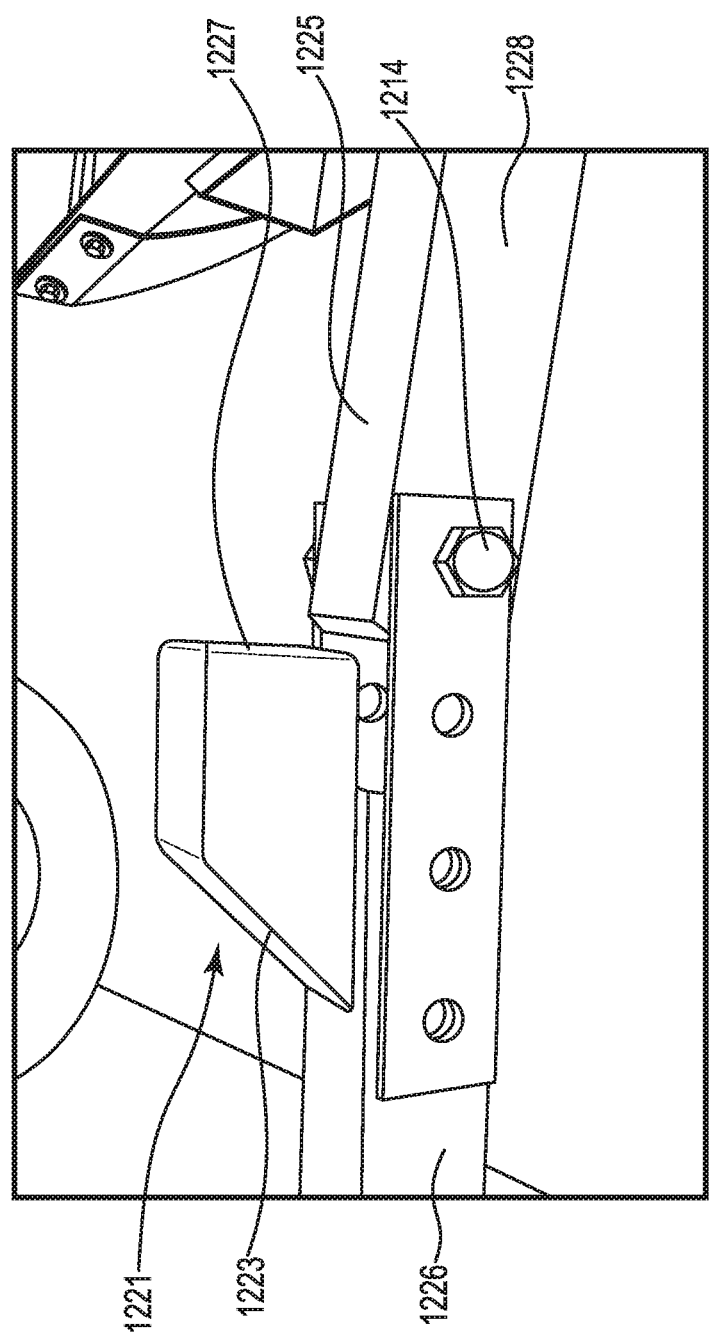
FIGS. 12A and 12B illustrate a stop mechanism that can be used to stop the motion of the platform as it is pivoted toward the tow vehicle according to one or more embodiments of the present disclosure.
Figure 12B:
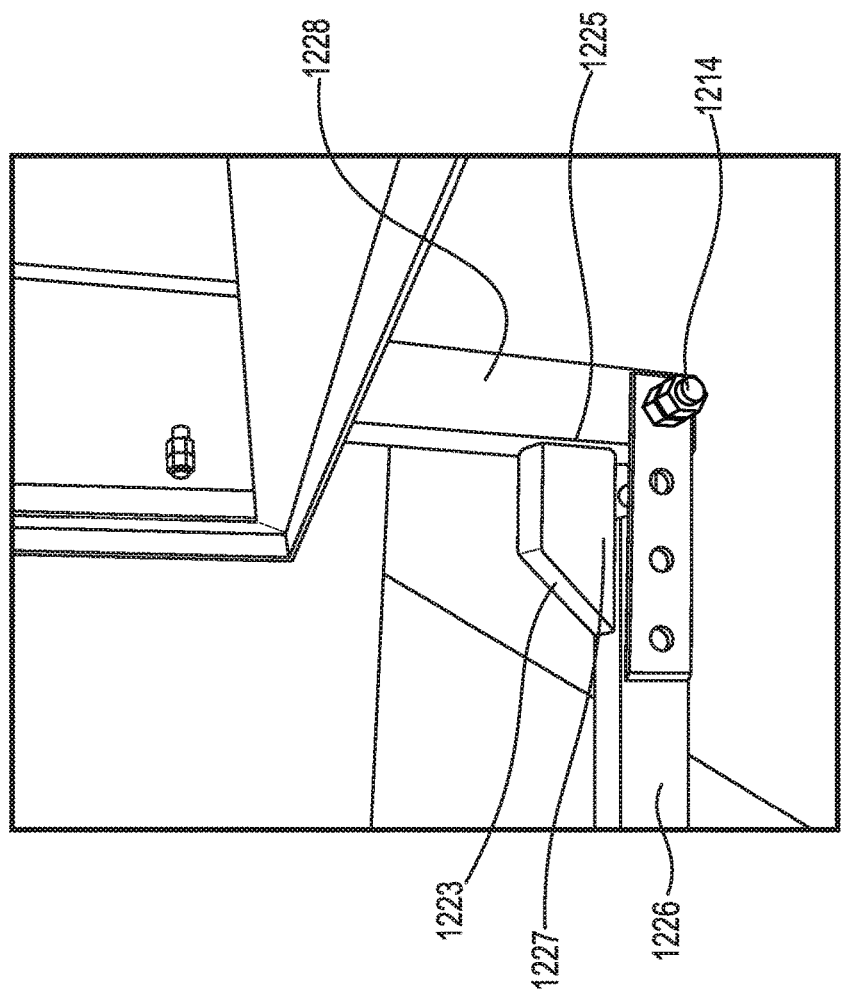

FIGS. 12A and 12B illustrate a stop mechanism that can be used to stop the motion of the platform as it is pivoted toward the tow vehicle according to one or more embodiments of the present disclosure. In the embodiment of FIGS. 12A and 12B, a stop mechanism 1221 is attached to the first portion of the tongue 1226.

As the second portion 1228 rotates around swivel pin 1214, it is stopped from further movement as surface 1225 of the second portion 1228 contacts surface 1227 of the stop mechanism 1221. In this manner, as the side surface of the first portion contacts the surface of the stop mechanism, the contact limits the range of motion that the first portion can tilt with respect to the second portion.

In some embodiments, the surface 1223 of the stop mechanism 1221 can be shaped to minimize its potential contact with the body of the tow vehicle. For example, in the embodiment shown in FIGS. 12A and 12B, the surface 1223 is angled away from the body of the tow vehicle. Although shown constructed from a square piece of tubing, the stop mechanism can have any suitable shape to provide the function of stopping the movement of the second portion and may be attached to any suitable surface of the tongue.

Figure 13A:
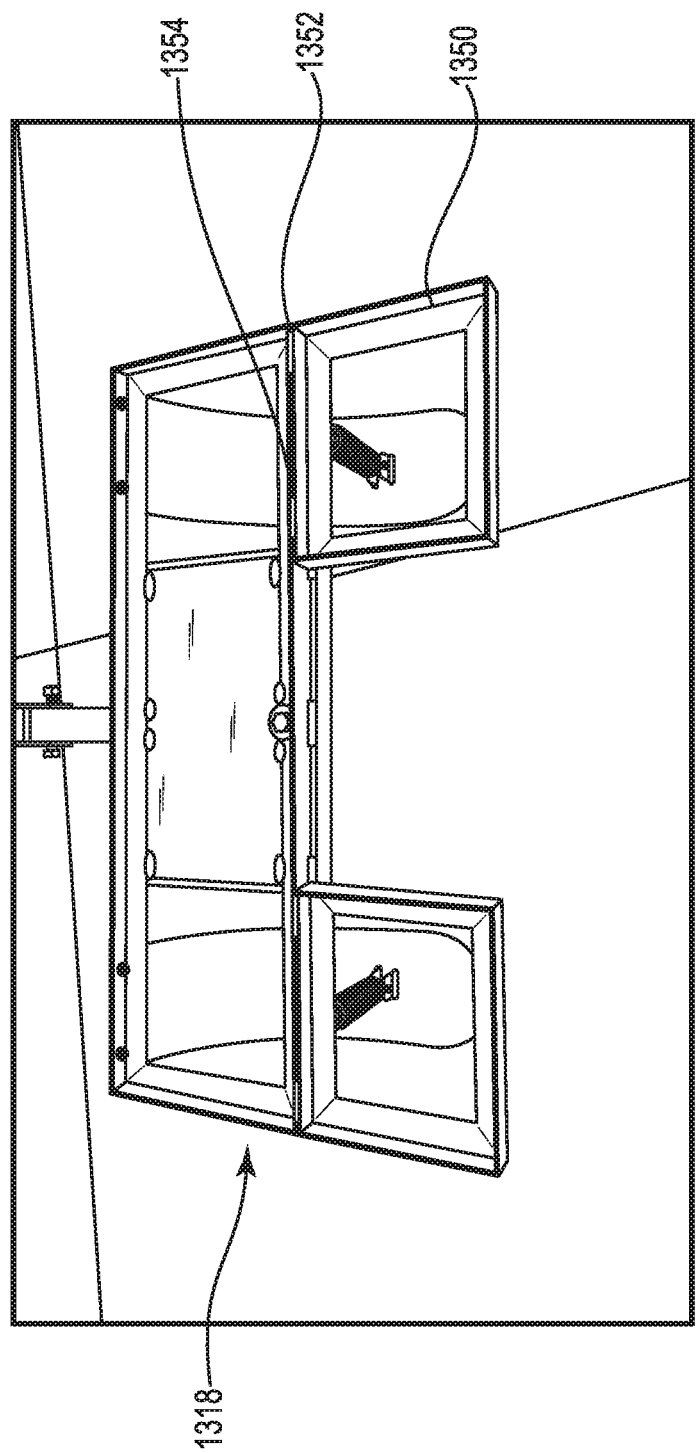
FIGS. 13A and 13B illustrate a plurality of platform extensions that can be used to increase the size of the platform according to one or more embodiments of the present disclosure.
Figure 13B:
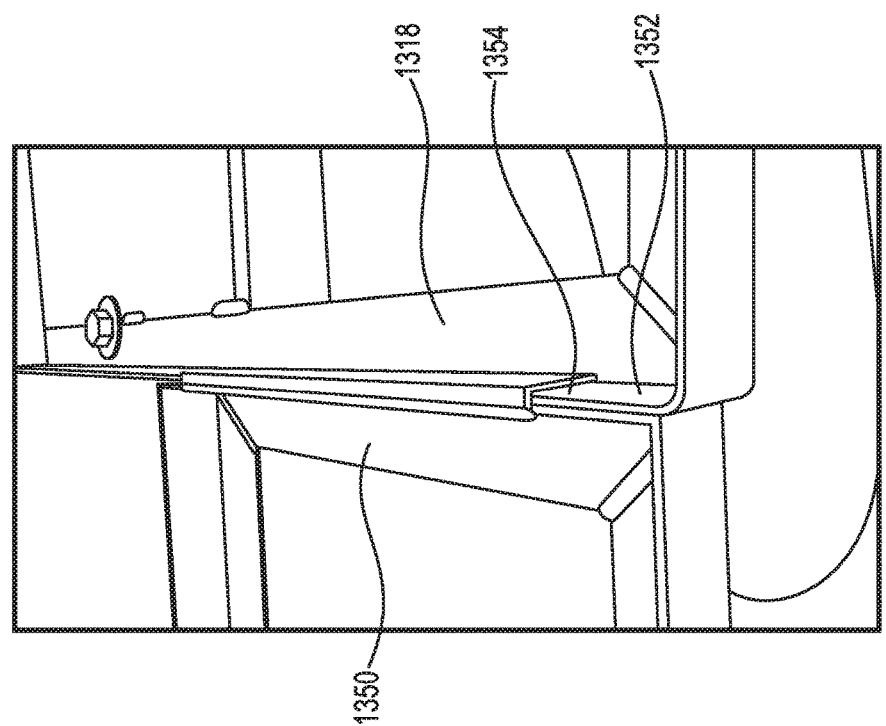

FIGS. 13A and 13B illustrate a plurality of platform extensions that can be used to increase the surface area of the platform according to one or more embodiments of the present disclosure. In various embodiments, one or more platform extensions can be utilized as discussed with respect to FIGS. 13A and 13B. For example, in the embodiment of FIGS. 13A and 13B, two platform extensions are shown.

The one or more extensions can be removable which allows the size of the platform to be increased and decreased as needed based upon the job to be accomplished or item to be carried. And, although the extension 1350 is shown as a square shape when viewed from the top, extensions can be any desirable shape that can be attached to the platform 1318.

Further, the attachment mechanism can be any suitable mechanism and can allow the extension to be either removably or permanently attached to the platform. For instance, the attachment can be made by welding or by fasteners, such as a nut and bolt, or other suitable attachment mechanisms.

In the embodiment of FIGS. 13A and 13B, the extension 1350 includes a flange 1354 wherein the side wall 1352 of the platform can be positioned between the wall of the extension and the flange 1354 effectively hanging the extension onto the wall 1352. This relationship between the flange 1354 and the wall 1352 can best be seen in FIG. 13B. Although the arrangement in FIG. 13B uses gravity to hold the extension in place (and the weight of the item(s) placed thereon), such a structure can also be locked in place using any suitable locking mechanism (e.g., nut and bolt, detent and hole, tab and slot, etc.).

Figure 14A:
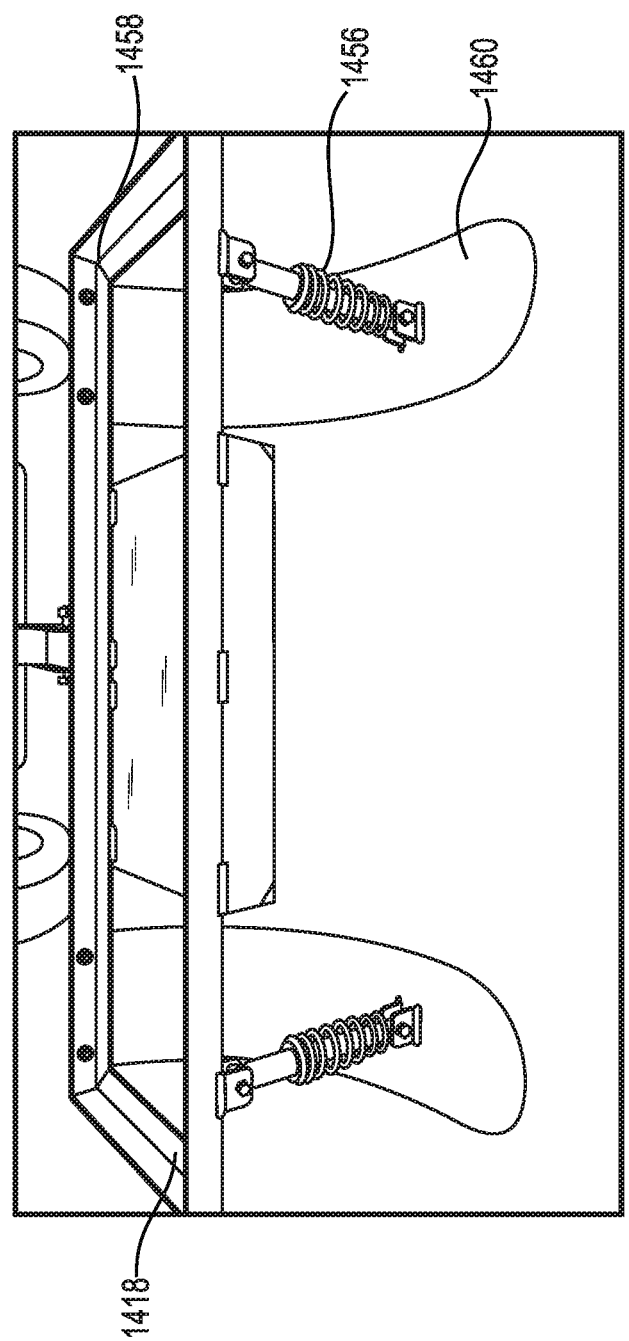
Figure 14C:
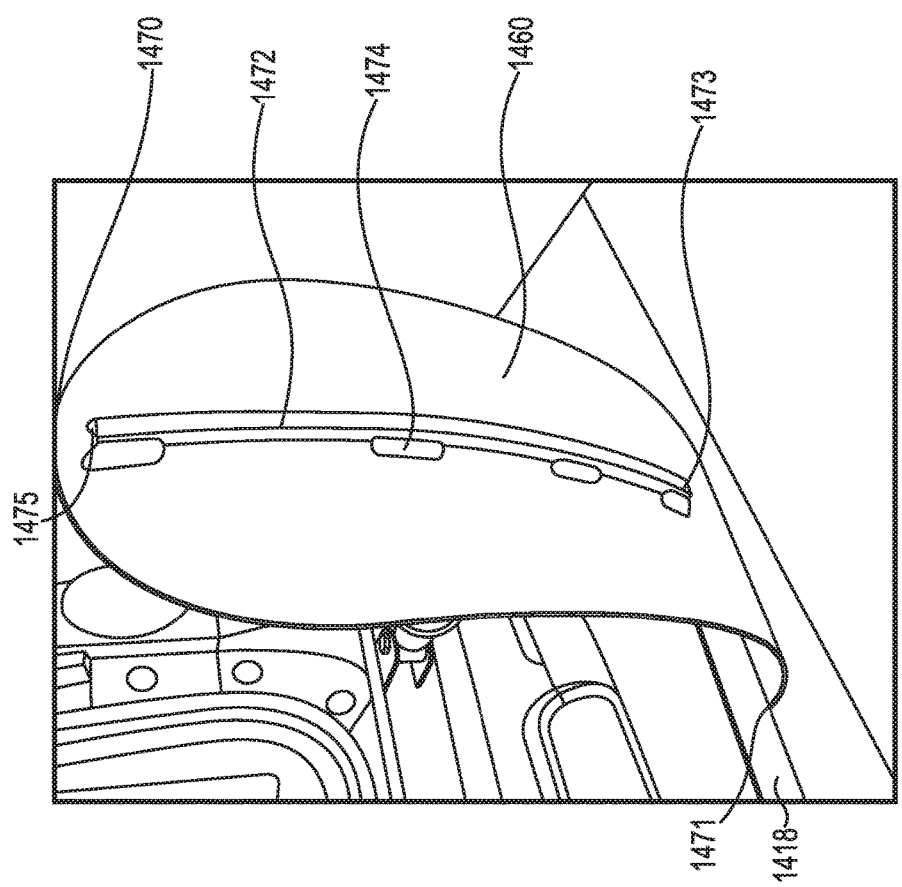

FIGS. 14A, 14B, and 14C illustrate a ground interface mechanism in the form of skis according to one or more embodiments of the present disclosure. As shown in FIGS. 14A, 14B, and 14C, skis 1460 can be utilized as a ground interface mechanism to allow the platform 1418 to contact the terrain and move more smoothly over it.

In the embodiment shown, one end 1471 of each ski 1460 is attached to the platform 1418 at 1458 and the other end 1470 contacts or is near the surface of the terrain. One benefit of the curved ski design shown is that when pulled behind a tow vehicle, end 1471 comes on contact with obstructions (rocks, tree stumps, logs, etc.) first and the curved design allows it to more easily traverse these obstructions than other ground interface mechanisms.

The attachment between the platform and the portion of the ski near the area that will contact the terrain can be rigid or movable. With a rigid connection, the platform may move in six degrees of freedom if the tongue allows for rotational movements.

However, such an arrangement may make it difficult to keep items on the platform, in some situations. Accordingly, as shown in FIGS. 14A and 14B, the attachments can be movable, thereby allowing the skis to move in relation to the platform.

In some embodiments the skis can move with respect to the platform, but move in unison. In the embodiment shown in FIGS. 14A and 14B, the skis are attached to the platform via independent suspension components allowing them to move independently of each other and the platform. This allows a much smoother ride over undulating terrain and can be very advantageous in some situations, such as on terrain with rocks, logs, stumps, and other obstructions.

Additionally, in order to steer the tow apparatus more easily, the skis 1460 can include one or more steering mechanisms 1472 (e.g., skegs). Any suitable steering mechanism can be used to assist in steering the platform while it is being towed by a tow vehicle.

For example, the skeg 1472, shown in FIG. 14C, runs down the middle of the ski 1460 and runs from one end 1475 toward the other end 1471. However, since only a portion of the ski is likely to contact the terrain, the other end of the skeg 1473 does not need to extend all the way to the end of the ski 1471.

The skeg can be attached in any suitable manner. As shown in FIG. 14C, the skeg 1472 can be welded on and attached to a bottom surface of the ski, in some embodiments. Welding can be beneficial as it provides a sturdy connection when the ski encounters obstacles, among other benefits.

As illustrated in FIGS. 14A, 14B, and 14C, the skis can also be attached to the platform with a strut 1456. The use of this strut affixed at another point along the ski, allows the ski to be curved between the end that is attached to the platform and the second end.

In some embodiments, the strut is an adjustable strut that changes the distance between the platform and terrain upon which the apparatus is to traverse. Further, as discussed above, a first strut can be attached to a first ski that is an adjustable strut that changes the distance between the platform and terrain upon which the apparatus is to traverse. A second strut can be attached to a second ski and can also be an adjustable strut that changes the distance between the platform and terrain upon which the apparatus is to traverse.

In such an embodiment, the first and second struts move independently of each other and allow the skis to move independently with respect to each other. This allows for a smoother traversal over areas that are not flat (the ground is sloped such that an item may slide off one side of the platform) and may have obstacles to traverse.

The embodiments of the present disclosure allow for towing of a vehicle in situations where towing would previously been difficult or impossible. This can be accomplished, for example, by a tow apparatus including a platform having a plurality supports for maintaining at least one wheel of a vehicle to be towed on the platform, at least one ground interface mechanism connected to the bottom of the platform, a tongue having a first portion for attachment to a tow vehicle, a second portion attached to the platform and a hinge between the first and second portions to allow the first portion to tilt with respect to the second portion, and a mechanism to allow the ground interface mechanism on the platform to change direction with respect to the tow vehicle. The hinge can also allow the platform to be folded for attachment to the tow vehicle or for compact storage or transport of the apparatus.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A tow apparatus, comprising:
a platform having a substantially planar medial portion, a front side having a first front end and a second front end, and a rear side having a first rear end and a second rear end, wherein:
the first front end is connected to the first rear end by a first strut,
the second front end is connected to the second rear end by a second strut;
the first front end, the first rear end, the first strut, and the medial portion define a first aperture through the platform for maintaining a first wheel of an off-highway vehicle to be towed on the platform,
the second front end, the second rear end, the second strut, and the medial portion define a second aperture through the platform for maintaining a second wheel of the off-highway vehicle to be towed on the platform; and
the medial portion includes an attachment point comprising an opening through the medial portion proximal to the rear side of the platform and configured to receive a fastener;

at least one ground interface mechanism below, and mounted on a bottom surface of, the medial portion of the platform;

a tongue having a first portion for attachment to an off-highway tow vehicle, a second portion attached to the platform at the attachment point via the fastener, and a hinge between the first and second portions to allow the first portion to tilt with respect to the second portion; and a swiveling tongue mechanism allowing one end of the tongue to move with respect to the platform about the fastener at the attachment point;

a stop on each lateral side of the medial portion of the platform limiting a range of the movement of the one end of the tongue with respect to the platform.

2. The apparatus of claim 1, wherein the platform includes an extension that is attached to the platform on at least one of the front side, rear side, first strut, and second strut, and thereby increases the surface area of the platform.

3. The apparatus of claim 1, wherein the tongue includes a bend between the platform and the hinge allowing the tow apparatus to be positioned closer to the ground.

4. The apparatus of claim 1, wherein the apparatus includes a releasable locking mechanism comprising another opening through the medial portion proximal to the front side of the platform to selectively stop the movable one end of the tongue from moving with respect to the platform.

5. A tow apparatus, comprising:
a platform having a substantially planar medial portion, a front side having a first front end and a second front end, and a rear side having a first rear end and a second rear end, wherein:
the first front end is connected to the first rear end by a first strut,
the second front end is connected to the second rear end by a second strut;
the first front end, the first rear end, the first strut, and the medial portion define a first aperture through the platform for maintaining a first wheel of an off-highway vehicle to be towed on the platform,
the second front end, the second rear end, the second strut, and the medial portion define a second aperture through the platform for maintaining a second wheel of the off-highway vehicle to be towed on the platform; and
the medial portion includes an attachment point comprising an opening through the medial portion proximal to the rear side of the platform and configured to receive a fastener;

at least one wheel below, and mounted on a bottom surface of, the medial portion of the platform, wherein the wheel contacts terrain over which the tow apparatus is to be towed;

a tongue having a first portion for attachment to an off-highway tow vehicle, a second portion attached to the platform at the attachment point via the fastener, and a hinge between the first and second portions to allow the first portion to tilt with respect to the second portion;

a swiveling tongue mechanism to allow one end of the tongue to move with respect to the platform about the fastener at the attachment point;

a stop on each lateral side of the medial portion of the platform limiting a range of the movement of the one end of the tongue with respect to the platform.

6. The apparatus of claim 5, wherein the at least one wheel includes a base attached to the bottom surface of the medial portion of the platform and wherein the at least one wheel rotates around a point on the base.

7. The apparatus of claim 5, wherein the at least one wheel includes a base attached to the bottom surface of the medial portion of the platform and wherein the at least one wheel does not rotate around a point on the base.

8. The apparatus of claim 5, wherein the tongue includes a stop mechanism to limit a range of motion that the first portion can tilt with respect to the second portion.

9. The apparatus of claim 8, wherein the stop mechanism contacts a side surface of the first portion to stop the motion of the first portion.

10. The apparatus of claim 5, wherein each of the front side, the rear side, the first strut, and the second strut includes at least one side wall that extends upward from a bottom surface thereof.

11. A tow apparatus, comprising:
a platform having a substantially planar medial portion, a front side having a first front end and a second front end, and a rear side having a first rear end and a second rear end, wherein:
the first front end is connected to the first rear end by a first strut,
the second front end is connected to the second rear end by a second strut;
the first front end, the first rear end, the first strut, and the medial portion define a first aperture through the platform for maintaining a first wheel of an off-highway vehicle to be towed on the platform
the second front end, the second rear end, the second strut, and the medial portion define a second aperture through the platform for maintaining a second wheel of the off-highway vehicle to be towed on the platform; and
the medial portion includes an attachment point comprising an opening through the medial portion proximal to the rear side of the platform and configured to receive a fastener;

at least one ski below the platform, and mounted on a front surface of the front side of the platform and a bottom surface of the rear side of the platform, wherein the ski contacts terrain over which the tow apparatus is to be towed;

a tongue having a first portion for attachment to an off-highway tow vehicle, a second portion attached to the platform at the attachment point via the fastener, and a hinge between the first and second portions to allow the first portion to tilt with respect to the second portion; and a swiveling tongue mechanism to allow one end of the tongue to move with respect to the platform about the fastener at the attachment point;

a stop on each lateral side of the medial portion of the platform limiting a range of the movement of the one end of the tongue with respect to the platform.

12. The apparatus of claim 11, wherein a first end of the at least one ski is attached to the front side of the platform.

13. The apparatus of claim 11, wherein the at least one ski is curved between a first end that is attached to the front side of the platform and a second end attached to the rear side of the platform.

14. The apparatus of claim 11, wherein the at least one ski is also attached to the platform via a strut.

15. The apparatus of claim 14, wherein the strut is an adjustable strut that changes the distance between the platform and terrain upon which the apparatus is to traverse.

16. The apparatus of claim 15, wherein the strut is a first strut is attached to the at least one ski and is an adjustable strut that changes the distance between the platform and terrain upon which the apparatus is to traverse and a second strut is attached to a second ski and is an adjustable strut that changes the distance between the platform and terrain upon which the apparatus is to traverse and does so independently with respect to the first strut.

17. The apparatus of claim 11, wherein the at least one ski includes a skeg attached to a bottom surface of the ski.

* * * * *